United States Patent
Lee

(12) United States Patent (10) Patent No.: US 8,369,515 B2
Lee (45) Date of Patent: Feb. 5, 2013

(54) CRYPTOGRAPHIC METHOD OF MULTILAYER DIFFUSION IN MULTIDIMENSION

(76) Inventor: Chiou-Haun Lee, Taichung (TW)

( * ) Notice: Subject to any disclaimer, the term of this patent is extended or adjusted under 35 U.S.C. 154(b) by 457 days.

(21) Appl. No.: 12/726,833

(22) Filed: Mar. 18, 2010

(65) Prior Publication Data

US 2011/0228927 A1 Sep. 22, 2011

(51) Int. Cl.
*H04K 1/00* (2006.01)
(52) U.S. Cl. .............................. 380/28; 380/37; 713/189
(58) Field of Classification Search .................... 380/28, 380/37
See application file for complete search history.

(56) References Cited

U.S. PATENT DOCUMENTS

| | | | | |
|---|---|---|---|---|
| 7,305,085 B2* | 12/2007 | Ohkuma et al. | ................ | 380/42 |
| 7,499,542 B2* | 3/2009 | Vaudenay et al. | ............. | 380/28 |
| 7,995,749 B2* | 8/2011 | Michaels | ....................... | 380/28 |
| 8,098,816 B2* | 1/2012 | Xiao et al. | ....................... | 380/28 |
| 8,165,288 B2* | 4/2012 | Shibutani et al. | ............... | 380/28 |
| 8,295,478 B2* | 10/2012 | Shirai et al. | ..................... | 380/28 |
| 2009/0103716 A1* | 4/2009 | Shirai | ............................ | 380/28 |
| 2010/0002873 A1* | 1/2010 | Ferguson | ....................... | 380/28 |
| 2010/0266122 A1* | 10/2010 | Suzaki et al. | ................... | 380/28 |
| 2011/0211688 A1* | 9/2011 | Shirai et al. | ..................... | 380/28 |
| 2011/0243319 A1* | 10/2011 | Shirai et al. | ..................... | 380/28 |

* cited by examiner

*Primary Examiner* — Amare F Tabor

(57) ABSTRACT

The invention provides a diffusion function working on a multidimensional diffusion-area (plaintext/ciphertext), in which a multidimensional medium is meanwhile overlapped to the diffusion-area; accordingly, repeating the diffusion function for at least one time thus brings about the multilayer effect. FIG. 1 shows an embodiment of the present invention in flow chart diagram form, comprising of: inputting a plaintext in encryption or a ciphertext in decryption 100; inputting a series of password data forward in encryption or backward in decryption 200; further, by the password data, converting the dimensions of the plaintext 300, and implementing with a diffusion function, repeated $T_E$ times in encryption, $T_D$ times in decryption 400; outputting the ciphertext in encryption or the plaintext in decryption 600 if completing all password data 500.

10 Claims, 3 Drawing Sheets

CRYPTOGRAPHIC METHOD OF MULTILAYER DIFFUSION IN MULTIDIMENSION

BACKGROUND OF THE INVENTION

1. Field of the Invention

The invention relates to a cryptographic method. More particularly, the invention relates to a diffusion function working on a multidimensional diffusion-area (plaintext/ciphertext), and further, repeating the diffusion function for at least one time to create a multilayer effect in order to perform the encryption and the decryption.

2. Description of the Related Art

The Applicant's following patent applications are related to the invention and are incorporated herein by reference: "Diffused Data Encryption/Decryption Processing Method", application Ser. No. 12/365,160, filed Feb. 3, 2009 (CIP of application Ser. No. 10/963,014, filed Oct. 12, 2004); "Multipoint Synchronous Diffused Encryption/Decryption Method", application Ser. No. 11/171,549, filed Jun. 30, 2005.

The prior art described that the coding of a 2D diffusion-area, see application Ser. No. 12/365,160, page 7, teaches the math of $A(i, j)=A \oplus Ac_i \oplus Ar_j \oplus b(i, j)$; further expressed the status of diffusion from inward to outward or vice versa in reverse, and implemented to multidimensional matrix $A(i_1, i_2, \ldots i_n)$, see application Ser. No. 11/171,549, page 4, 7.

The present invention emphasizes the multilayer effect of multidimensional diffusion. The diffusion function herein is notated specially by $AF(p_1, p_2, \ldots p_n)$ to differentiate from the traditional symbolization of matrix position.

SUMMARY OF THE INVENTION

The invention provides a diffusion function working on a multidimensional diffusion-area (plaintext/ciphertext), in which a multidimensional medium is meanwhile overlapped to the diffusion-area; accordingly, repeating the diffusion function for at least one time thus brings about the multilayer effect. In addition, the numbers of repetition, a so called diffusion-cycle, is then able to divide into two parts: one for encrypting, the other for decrypting; consequently, the original status of the diffusion-area is recovered through the diffusion-cycle. The steps are shown as follows:

(a) Selecting a diffusion function, a multidimensional medium;
(b) Inputting a multidimensional diffusion-area (plaintext/ciphertext), for which the dimensions are the same as the medium's, and generating a diffusion-cycle;
(c) Repeating the diffusion function working on a plaintext for a first part of the diffusion-cycle to generate a ciphertext;
(d) Repeating the diffusion function working on the ciphertext for a second part of the diffusion-cycle to recover the plaintext.

DETAILED DESCRIPTION OF THE PREFERRED EMBODIMENTS

Figure 1:
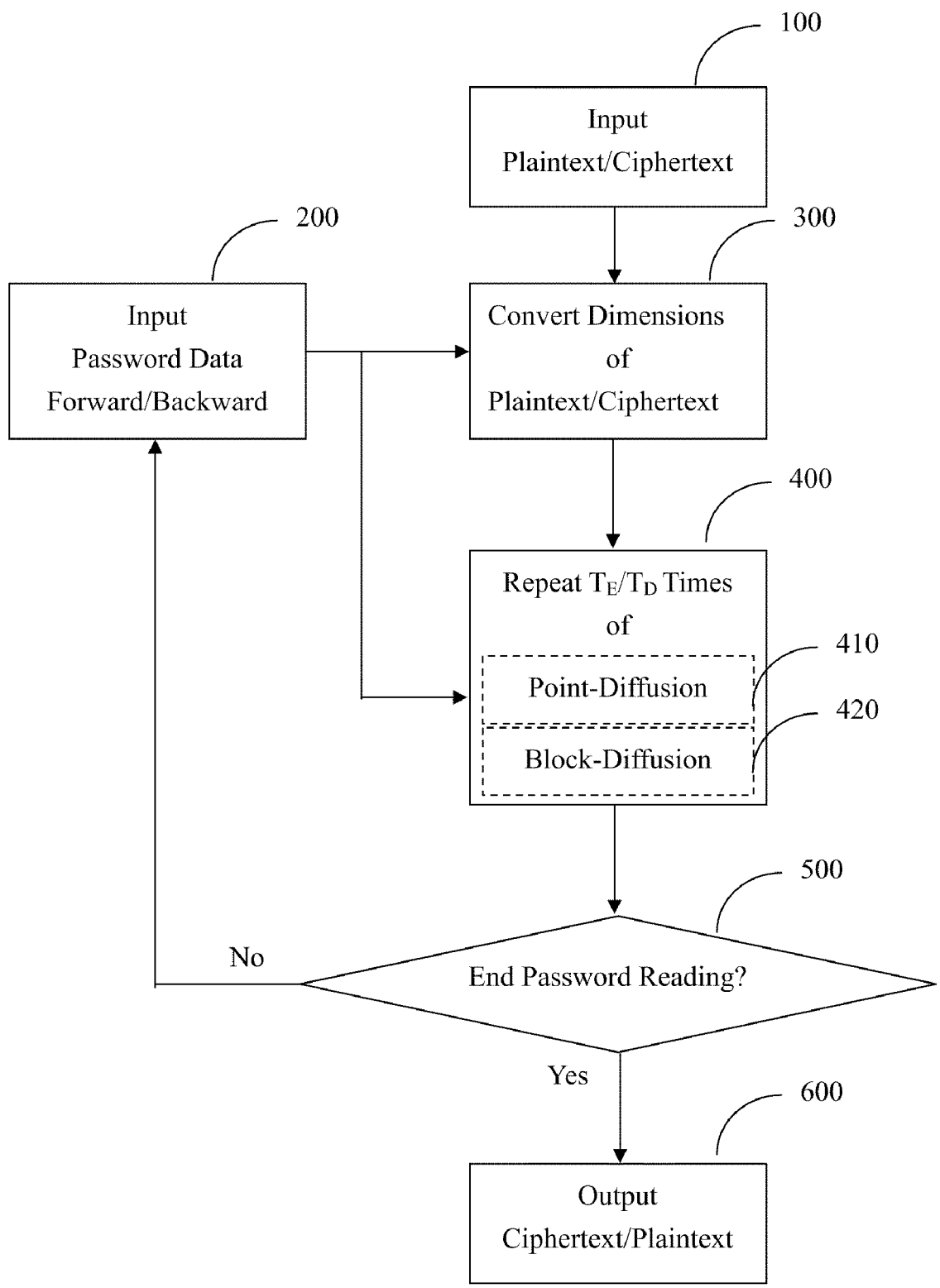
FIG. 1 is a summary flow chart diagram showing the main steps taken while encrypting/decrypting by repeating diffusion function in accordance with the present invention.

FIG. 1 shows an embodiment of the present invention in flow chart diagram form. This system comprises of: inputting a plaintext in encryption or a ciphertext in decryption 100; inputting a series of password data forward in encryption or backward in decryption 200; further, by the password data, converting the dimensions of the plaintext 300, and implementing with a function of diffusion, repeated $T_E$ times in encryption, $T_D$ times in decryption 400; outputting the ciphertext in encryption or the plaintext in decryption 600 if completing all password data 500.

Figure 2A:
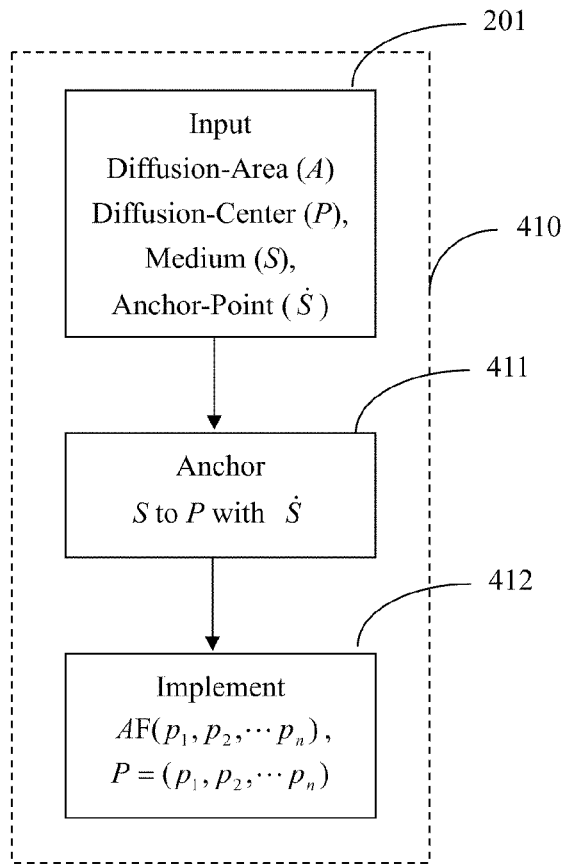
FIG. 2A is a summary flow chart diagram of FIG. 1, 410 showing the steps taken while originating the function of point-diffusion from a diffusion-center in accordance with the present invention.
Figure 2B:
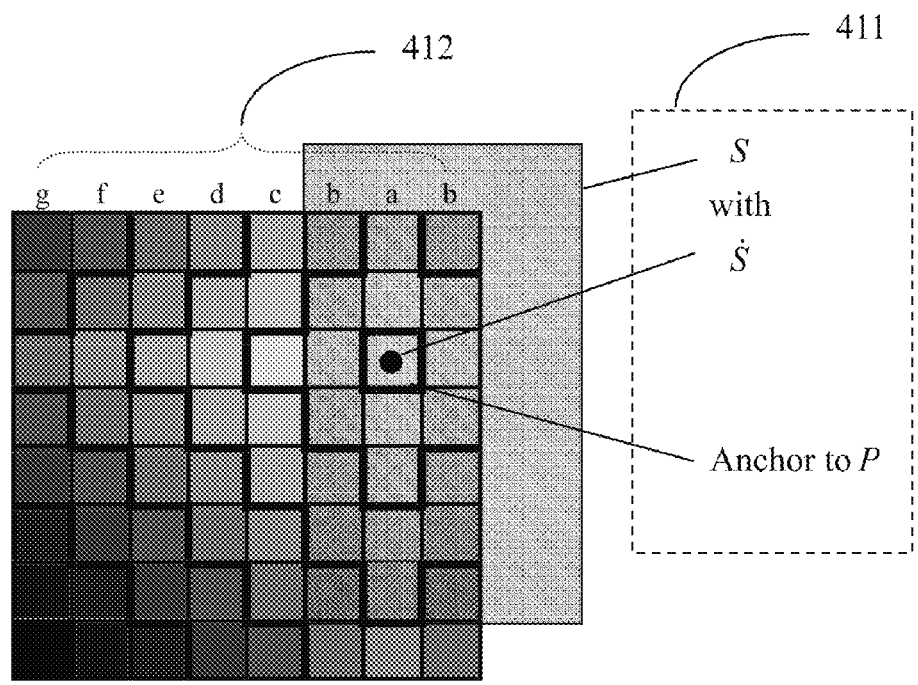
FIG. 2B is a two-dimension visualized diagram of FIG. 2A showing the point-diffusion by way of a medium anchoring to a diffusion-center in accordance with the present invention.

Function of Point-Diffusion:

FIG. 2A shows an embodiment of the point-diffusion function, FIG. 1, 410, in flow chart diagram. The function comprises of: reading a diffusion-area (plaintext/ciphertext), a diffusion-center, and a medium with an anchor-point 201; anchoring the medium to the diffusion-center with the anchor-point 411; implementing the point-diffusion $AF(p_1, p_2, \ldots p_n)$ 412, which is further detailed in Notation of Point-Diffusion. In addition, also see FIG. 2B with 2D visualization for a more clear view, the diffusion effect colored from white to black generates the column segments a-g, a-b for later diffusion calculation.

Notation of Point-Diffusion:

A: a diffusion-area, wherein A expresses a $d_1 \times d_2 \times \ldots \times d_n$ binary matrix, wherein A includes a diffusion-center $\dot{P}$ expressed $(p_1, p_2, \ldots p_n)$ coordinate position.

S: a n-dimension medium, expresses a $s_1 \times s_2 \times \ldots \times s_n$ binary matrix, wherein S includes an anchor-point $\dot{S}$ expressed $(s_1, s_2, \ldots, s_n)$ coordinate position.

$AF(p_1, p_2, \ldots p_n)$: the diffusion-area A performs the function of point-diffusion at position $\dot{P}$, wherein S overlaps A by $\dot{S}$ anchoring to $\dot{P}$; further comprising:

$AF(p_1, p_2, \ldots, p_n) = A \oplus Ad_{1p} \oplus Ad_{2p} \oplus \ldots \oplus Ad_{np} \oplus S$;

$Ad_{ip} = [A_{d_i}(2), \ldots, A_{d_i}(p_i), A_{d_i}(0), A_{d_i}(p_i), \ldots, A_{d_i}(d_i - 1)]$;

$Ad_{ip}$ expresses a series of n−1 dimensional binary matrix $A_{d_i}$ on the axis $d_i$. Furthermore, $A_{d_i}(p_i)$ represents the original $A_{d_i}$ the coordinate $p_i$, and then, $A_{d_i}(0)$ expresses a zero matrix filling at the coordinate $p_i$.

For example: 2D point-diffusion, with rows for x, columns for y, $AF(p_x=3, p_y=2)$.

Suppose $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix},$$

$$\dot{S} = (2, 1)$$

thus $$AF(3, 2) = A \oplus Ax_3 \oplus Ay_2 \oplus S$$
$$= A \oplus \begin{bmatrix} a_{21} & a_{22} & a_{23} & a_{24} \\ a_{31} & a_{32} & a_{33} & a_{34} \\ 0 & 0 & 0 & 0 \\ a_{31} & a_{32} & a_{33} & a_{34} \end{bmatrix} \oplus \begin{bmatrix} a_{12} & 0 & a_{12} & a_{13} \\ a_{22} & 0 & a_{22} & a_{23} \\ a_{32} & 0 & a_{32} & a_{33} \\ a_{42} & 0 & a_{42} & a_{43} \end{bmatrix} \oplus$$
$$\begin{bmatrix} 0 & 0 & 0 & 0 \\ 0 & s_{11} & s_{12} & s_{13} \\ 0 & s_{21} & s_{22} & s_{23} \\ 0 & s_{31} & s_{32} & s_{33} \end{bmatrix}$$

In detail, $Ax_3$ expresses a series of one dimensional binary matrixes $A_x$ on the axis x; wherein $Ax_3$ comprises $A_x(2)=[a_{21}\ a_{22}\ a_{23}\ a_{24}]$ to position 1, $A_x(3)=[a_{31}\ a_{32}\ a_{33}\ a_{34}]$ to positions 2, 4, and $A_x(0)=[0\ 0\ 0\ 0]$ at position 3. Furthermore, $Ay_2$ expresses a series of one dimensional binary matrixes $A_y$ on the axis y; wherein $Ay_2$ comprises $$A_y(2) = \begin{bmatrix} a_{12} \\ a_{22} \\ a_{32} \\ a_{42} \end{bmatrix}$$

to positions 1, 3, $$A_y(3) = \begin{bmatrix} a_{13} \\ a_{23} \\ a_{33} \\ a_{43} \end{bmatrix}$$

to position 4, and $$A_y(0) = \begin{bmatrix} 0 \\ 0 \\ 0 \\ 0 \end{bmatrix}$$

at position 2.

Finally, the effective S comes from the overlap between S and A, while $\dot{S}=(2,1)$ anchors to $P=(3,2)$.

For example: 3D point-diffusion $AF(p_x=3, p_y=2, p_z=1)$.

Suppose $$A = \left[\begin{array}{cccc|cccc|cccc} \multicolumn{4}{c|}{z=1} & \multicolumn{4}{c|}{z=2} & \multicolumn{4}{c}{z=3} \\ a_{111} & a_{121} & a_{131} & a_{141} & a_{112} & a_{122} & a_{132} & a_{142} & a_{113} & a_{123} & a_{133} & a_{143} \\ a_{211} & a_{221} & a_{231} & a_{241} & a_{212} & a_{222} & a_{232} & a_{242} & a_{213} & a_{223} & a_{233} & a_{243} \\ a_{311} & a_{321} & a_{331} & a_{341} & a_{312} & a_{322} & a_{332} & a_{342} & a_{313} & a_{323} & a_{333} & a_{343} \\ a_{411} & a_{421} & a_{431} & a_{441} & a_{412} & a_{422} & a_{432} & a_{442} & a_{413} & a_{423} & a_{433} & a_{443} \end{array}\right],$$

$$S = \left[\begin{array}{cccc|cccc|cccc} \multicolumn{4}{c|}{z=1} & \multicolumn{4}{c|}{z=2} & \multicolumn{4}{c}{z=3} \\ s_{111} & s_{121} & s_{131} & s_{141} & s_{112} & s_{122} & s_{132} & s_{142} & s_{113} & s_{123} & s_{133} & s_{143} \\ s_{211} & s_{221} & s_{231} & s_{241} & s_{212} & s_{222} & s_{232} & s_{242} & s_{213} & s_{223} & s_{233} & s_{243} \\ s_{311} & s_{321} & s_{331} & s_{341} & s_{312} & s_{322} & s_{332} & s_{342} & s_{313} & s_{323} & s_{333} & s_{343} \\ s_{411} & s_{421} & s_{431} & s_{441} & s_{412} & s_{422} & s_{432} & s_{442} & s_{413} & s_{423} & s_{433} & s_{443} \end{array}\right],$$

$\dot{S} = (2, 1, 3)$; thus, $AF(3, 2, 1) = A \oplus Ax_3 \oplus Ay_2 \oplus Az_1 \oplus S =$ $$A \ldots \oplus \left[\begin{array}{cccc|cccc|cccc} \multicolumn{4}{c|}{z=1} & \multicolumn{4}{c|}{z=2} & \multicolumn{4}{c}{z=3} \\ a_{211} & a_{221} & a_{231} & a_{241} & a_{212} & a_{222} & a_{232} & a_{242} & a_{213} & a_{223} & a_{233} & a_{243} \\ a_{311} & a_{321} & a_{331} & a_{341} & a_{312} & a_{322} & a_{332} & a_{342} & a_{313} & a_{323} & a_{333} & a_{343} \\ 0 & 0 & 0 & 0 & 0 & 0 & 0 & 0 & 0 & 0 & 0 & 0 \\ a_{311} & a_{321} & a_{331} & a_{341} & a_{312} & a_{322} & a_{332} & a_{342} & a_{313} & a_{323} & a_{333} & a_{343} \end{array}\right] \oplus$$

$$\left[\begin{array}{cccc|cccc|cccc} \multicolumn{4}{c|}{z=1} & \multicolumn{4}{c|}{z=2} & \multicolumn{4}{c}{z=3} \\ a_{121} & 0 & a_{121} & a_{131} & a_{122} & 0 & a_{122} & a_{132} & a_{123} & 0 & a_{123} & a_{133} \\ a_{221} & 0 & a_{221} & a_{231} & a_{222} & 0 & a_{222} & a_{232} & a_{223} & 0 & a_{223} & a_{233} \\ a_{321} & 0 & a_{321} & a_{331} & a_{322} & 0 & a_{322} & a_{332} & a_{323} & 0 & a_{323} & a_{333} \\ a_{421} & 0 & a_{421} & a_{431} & a_{422} & 0 & a_{422} & a_{432} & a_{423} & 0 & a_{423} & a_{433} \end{array}\right] \oplus$$

$$\left[\begin{array}{cccc|cccc|cccc} \multicolumn{4}{c|}{z=1} & \multicolumn{4}{c|}{z=2} & \multicolumn{4}{c}{z=3} \\ 0 & 0 & 0 & 0 & a_{111} & a_{121} & a_{131} & a_{141} & a_{112} & a_{122} & a_{132} & a_{142} \\ 0 & 0 & 0 & 0 & a_{211} & a_{221} & a_{231} & a_{241} & a_{212} & a_{222} & a_{232} & a_{242} \\ 0 & 0 & 0 & 0 & a_{311} & a_{321} & a_{331} & a_{341} & a_{312} & a_{322} & a_{332} & a_{342} \\ 0 & 0 & 0 & 0 & a_{411} & a_{421} & a_{431} & a_{441} & a_{412} & a_{422} & a_{432} & a_{442} \end{array}\right] \oplus$$

-continued $$\begin{bmatrix} \overline{z=1} & | & \overline{z=2} & | & \overline{z=3} \\ 0 & 0 & 0 & 0 & 0 & 0 & 0 & 0 & 0 & 0 & 0 & 0 \\ 0 & s_{113} & s_{123} & s_{133} & 0 & 0 & 0 & 0 & 0 & 0 & 0 & 0 \\ 0 & s_{213} & s_{223} & s_{233} & 0 & 0 & 0 & 0 & 0 & 0 & 0 & 0 \\ 0 & s_{313} & s_{323} & s_{333} & 0 & 0 & 0 & 0 & 0 & 0 & 0 & 0 \end{bmatrix}.$$

In detail, $Ax_3$ expresses a series of two dimensional binary matrixes $A_x$ on the axis x; wherein $Ax_3$ comprises $$A_x(2) = \left[ \begin{array}{cccc|cccc|cccc} \overline{z=1} & & & & \overline{z=2} & & & & \overline{z=3} & & & \\ a_{211} & a_{221} & a_{231} & a_{241} & a_{212} & a_{222} & a_{232} & a_{242} & a_{213} & a_{223} & a_{233} & a_{243} \end{array} \right]$$

to position 1.

$$A_x(3) = \left[ \begin{array}{cccc|cccc|cccc} \overline{z=1} & & & & \overline{z=2} & & & & \overline{z=3} & & & \\ a_{311} & a_{321} & a_{331} & a_{341} & a_{312} & a_{322} & a_{332} & a_{342} & a_{313} & a_{323} & a_{333} & a_{343} \end{array} \right]$$

to positions 2, 4, and $$A_x(0) = \left[ \begin{array}{cccc|cccc|cccc} \overline{z=1} & & & & \overline{z=2} & & & & \overline{z=3} & & & \\ 0 & 0 & 0 & 0 & 0 & 0 & 0 & 0 & 0 & 0 & 0 & 0 \end{array} \right]$$

at position 3.

Furthermore, $Ay_2$ expresses a series of two dimensional binary matrixes $A_y$ on the axis y; wherein $Ay_2$ comprises $$A_y(2) = \begin{bmatrix} \overline{z=1} & | & \overline{z=2} & | & \overline{z=3} \\ \overline{a_{121}} & | & \overline{a_{122}} & | & \overline{a_{123}} \\ a_{221} & | & a_{222} & | & a_{223} \\ a_{321} & | & a_{322} & | & a_{323} \\ a_{421} & | & a_{422} & | & a_{423} \end{bmatrix}$$

to positions 1, 3, $$A_y(3) = \begin{bmatrix} \overline{z=1} & | & \overline{z=2} & | & \overline{z=3} \\ \overline{a_{131}} & | & \overline{a_{132}} & | & \overline{a_{133}} \\ a_{231} & | & a_{232} & | & a_{233} \\ a_{331} & | & a_{332} & | & a_{333} \\ a_{431} & | & a_{432} & | & a_{433} \end{bmatrix}$$

to position 4, and $$A_y(0) = \begin{bmatrix} \overline{z=1} & | & \overline{z=2} & | & \overline{z=3} \\ \overline{0} & | & \overline{0} & | & \overline{0} \\ 0 & | & 0 & | & 0 \\ 0 & | & 0 & | & 0 \\ 0 & | & 0 & | & 0 \end{bmatrix}$$

at position 2.

Moreover, $Az_1$ expresses a series of two dimensional binary matrixes $A_z$ on the axis z; wherein $Az_1$ comprises $$A_z(1) = \begin{bmatrix} a_{111} & a_{121} & a_{131} & a_{141} \\ a_{211} & a_{221} & a_{231} & a_{241} \\ a_{311} & a_{321} & a_{331} & a_{341} \\ a_{411} & a_{421} & a_{431} & a_{441} \end{bmatrix}$$

to position 2, $$A_z(2) = \begin{bmatrix} a_{112} & a_{122} & a_{132} & a_{142} \\ a_{212} & a_{222} & a_{232} & a_{242} \\ a_{312} & a_{322} & a_{332} & a_{342} \\ a_{412} & a_{422} & a_{432} & a_{442} \end{bmatrix}$$

to position 3, and $$A_z(0) = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

at position 1. Finally, the effective S comes from the overlap between S and A, while $\dot{S}=(2,1,3)$ anchors to $P=(3,2,1)$.

$AF(p_1, p_2^t, \ldots, p_n)$: A performs the function of point-diffusion, repeated t times.

Example: (a) $AF(p_1, p_2^2, \ldots, p_n) = AF(p_1, p_2, \ldots, p_n)F(p_1, p_2, \ldots, p_n)$ (b) $AF(p_1, p_2^1, \ldots, p_n) = AF(p_1, p_2, \ldots, p_n)$ (c) $AF(p_1, p_2^0, \ldots, p_n) = A$ T: a diffusion-cycle, expresses $AF(p_1, p_2^T, \ldots, p_n) = A$, wherein $T=2^{U+1}$, $U=\lceil \log_2 u \rceil$, $u=\max(d_1, d_2, \ldots, d_n)$.

Figure 3A:
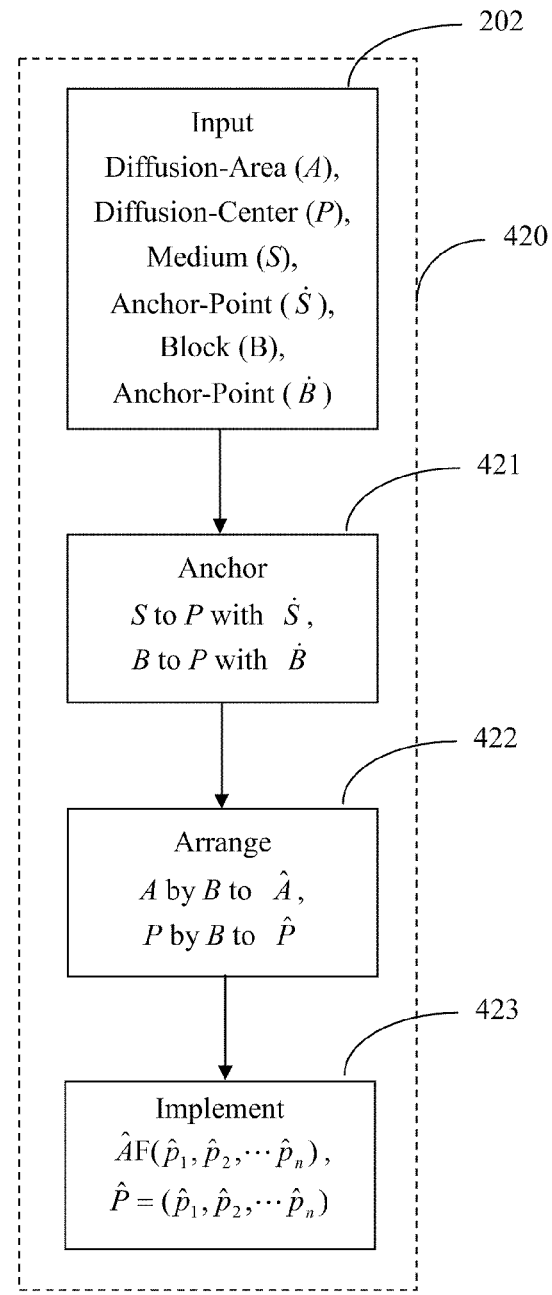
FIG. 3A is a summarized flow chart diagram of FIG. 1, 420 showing the steps taken while originating the function of block-diffusion from a block diffusion-center in accordance with the present invention.
Figure 3B:
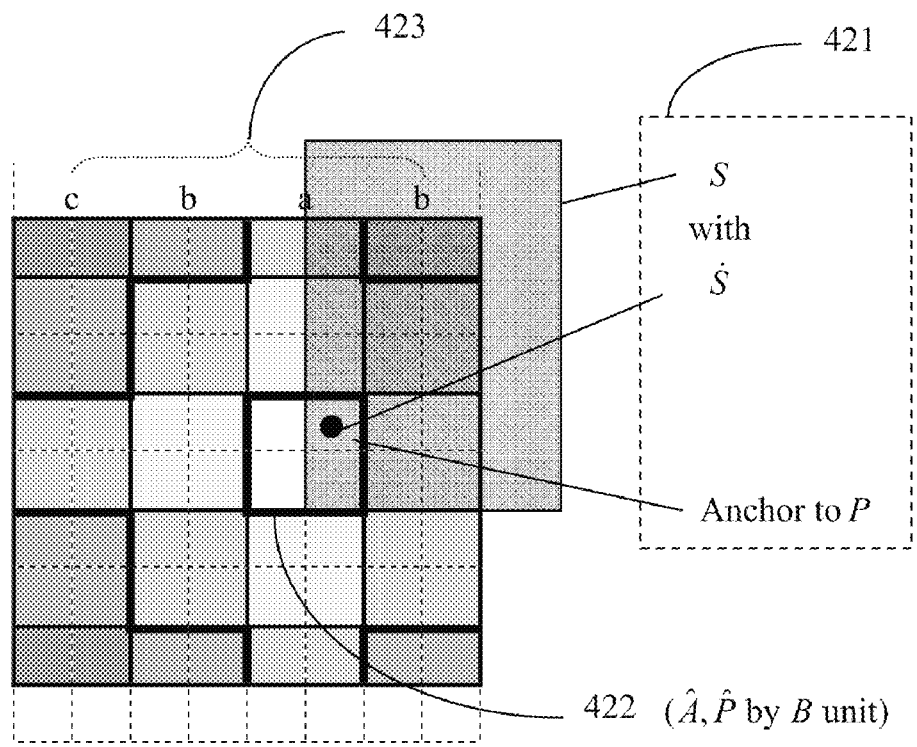
FIG. 3B is a two-dimension visualized diagram of FIG. 3A showing the block-diffusion by way of a medium anchoring to a diffusion-center, a block anchoring to the diffusion-center to form a block diffusion-center in accordance with the present invention.

Function of Block-Diffusion:

FIG. 3A shows an embodiment of the block-diffusion function, FIG. 1, 420, in flow chart diagram. The function comprises of: reading a diffusion-area (plaintext/ciphertext), a diffusion-center, a medium with an anchor-point and a block with an anchor-point 202; anchoring the medium and the block to the diffusion-center with the anchor-point 421; implementing the block-diffusion $\hat{A}F(\hat{p}_1, \hat{p}_2, \ldots \hat{p}_n)$ 422, further detailed in Notation of Block-Diffusion. In addition, also see FIG. 3B with 2D visualization for a more clear view, the diffusion effect colored from white to black generates the block-column segments a-c, a-b for later diffusion calculation.

Notation of Block-Diffusion:

A: a n-dimension plaintext, expresses a $d_1 \times d_2 \times \ldots \times d_n$ binary matrix, wherein A includes a diffusion-center P expressed $(p_1, p_2, \ldots p_n)$ coordinate position.

S: a n-dimension medium, expresses a $s_1 \times s_2 \times \ldots \times s_n$ binary matrix, wherein S includes an anchor-point $\dot{S}$ expressed $(\dot{s}_1, \dot{s}_2, \ldots, \dot{s}_n)$ coordinate position.

B: a n-dimension unit-block, expresses a $b_1 \times b_2 \times \ldots \times b_n$ binary matrix, wherein B includes an anchor-point $\dot{B}$ expressed $(\dot{b}_1, \dot{b}_2, \ldots, \dot{b}_n)$ coordinate position.

$\hat{A}F(\hat{p}_1, \hat{p}_2, \ldots \hat{p}_n)$: $\hat{A}$ performs the function of block-diffusion, wherein $\hat{A}$ expresses A by B unit seeing that $\dot{B}$ anchors to P, and thus, includes a block diffusion-center $\hat{P}$ expressed $(\hat{p}_1, \hat{p}_2, \ldots \hat{p}_n)$ coordinate position. Therefore, $\hat{A}$ translates into a $\hat{d}_1 \times \hat{d}_2 \times \ldots \times \hat{d}_n$ binary matrix, wherein $\hat{d}_i = \lceil (p_i - \dot{b}_i)/b_i \rceil + \lceil (d_i - p_i + \dot{b}_i/b_i \rceil$, and $\hat{p}_i = |(p_i - \dot{b}_i)/b_i| + 1$; further comprising:

$$\hat{A}F(\hat{p}_1, \hat{p}_2, \ldots, \hat{p}_n) = \hat{A} \oplus \hat{A}\hat{d}_{1\hat{p}} \oplus \hat{A}\hat{d}_{2\hat{p}} \oplus \ldots \oplus \hat{A}\hat{d}_{n\hat{p}} \oplus S;$$

$$\hat{A}\hat{d}_{i\hat{p}} = [\hat{A}_{\hat{d}_i}(2), \ldots, \hat{A}_{\hat{d}_i}(\hat{p}_i), \hat{A}_{\hat{d}_i}(0), \hat{A}_{\hat{d}_i}(\hat{p}_i), \ldots, \hat{A}_{\hat{d}_i}(\hat{d}_i - 1)];$$

$\hat{A}\hat{d}_{i\hat{p}}$ expresses a series of n−1 dimensional binary matrixes $$\hat{A}_{\hat{d}_i}$$

on the axis $\hat{d}_i$. Furthermore, $$\hat{A}_{\hat{d}_i}(\hat{p}_i)$$

represents the original $$\hat{A}_{\hat{d}_i}$$

at the coordinate $\hat{p}_i$, and then, $$\hat{A}_{\hat{d}_i}(0)$$

expresses a zero matrix tilling at the coordinate $\hat{p}_i$.

For example: 2D block-diffusion, with rows for x, columns for y, $AF(p_x=3, p_y=2)$. Suppose $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}, S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix},$$

$$B = \begin{bmatrix} b_{11} & b_{12} \\ b_{21} & b_{22} \end{bmatrix}, \dot{S} = (2, 1), \dot{B} = (1, 1);$$

thus, dimensions $\hat{x} = \lceil (3-1)/2 \rceil + \lceil (4-3+1)/2 \rceil = 2$ and $\hat{y} = \lceil (2-1)/2 \rceil + \lceil (4-2+1)/2 \rceil = 3$;

$$\hat{A} = \begin{bmatrix} 0 & a_{11} & a_{12} & a_{13} & a_{14} & 0 \\ 0 & a_{21} & a_{22} & a_{23} & a_{24} & 0 \\ 0 & a_{31} & a_{32} & a_{33} & a_{34} & 0 \\ 0 & a_{41} & a_{42} & a_{43} & a_{44} & 0 \end{bmatrix}$$

that shows the block-diffusion in 2×3 blocks, but with the data still kept in 4×4 bits. And now $\hat{p}_x = \lceil (3-1)/2 \rceil + 1 = 2$, $\hat{p}_y = \lceil (2-1)/2 \rceil + 1 = 2$, thus $$AF(3,2) \xrightarrow{block} \hat{A}F(2,2) = \hat{A} \oplus \hat{A}\hat{x}_2 \oplus \hat{A}\hat{y}_2 \oplus S = A \oplus$$

$$\begin{bmatrix} a_{31} & a_{32} & a_{33} & a_{34} \\ a_{41} & a_{42} & a_{43} & a_{44} \\ 0 & 0 & 0 & 0 \\ 0 & 0 & 0 & 0 \end{bmatrix} \oplus \begin{bmatrix} a_{13} & 0 & 0 & a_{12} \\ a_{23} & 0 & 0 & a_{22} \\ a_{33} & 0 & 0 & a_{32} \\ a_{43} & 0 & 0 & a_{42} \end{bmatrix} \oplus$$

$$\begin{bmatrix} 0 & 0 & 0 & 0 \\ 0 & s_{11} & s_{12} & s_{13} \\ 0 & s_{21} & s_{22} & s_{23} \\ 0 & s_{31} & s_{32} & s_{33} \end{bmatrix}.$$

In detail, $\hat{A}\hat{x}_2$ expresses a series of one dimensional binary matrixes $\hat{A}_{\hat{x}}$ on the axis $\hat{x}$; wherein $\hat{A}\hat{x}_2$ comprises $$\hat{A}_{\hat{x}}(2) = \begin{bmatrix} a_{31} & a_{32} & a_{33} & a_{34} \\ a_{41} & a_{42} & a_{43} & a_{44} \end{bmatrix}$$

to position 1, and $$\hat{A}_{\hat{x}}(0) = \begin{bmatrix} 0 & 0 & 0 & 0 \\ 0 & 0 & 0 & 0 \end{bmatrix}$$

at position 2. Furthermore, $\hat{A}\hat{y}_2$ expresses a series of one dimensional binary matrixes $\hat{A}_{\hat{y}}$ on the axis $\hat{y}$; wherein $\hat{A}\hat{y}_2$ comprises $$\hat{A}_{\hat{y}}(2) = \begin{bmatrix} a_{12} & a_{13} \\ a_{22} & a_{23} \\ a_{32} & a_{33} \\ a_{42} & a_{43} \end{bmatrix}$$

to positions 1, 3, and $$\hat{A}_{\hat{y}}(0) = \begin{bmatrix} 0 & 0 \\ 0 & 0 \\ 0 & 0 \\ 0 & 0 \end{bmatrix}$$

at position 2. Finally, the effective S comes from the overlap between S and A, while $\dot{S}=(2,1)$ anchors to P=(3,2).

For example: 3D block-diffusion $AF(p_x=3, p_y=2, p_z=1)$.
Suppose $$A = \begin{bmatrix} \overbrace{\begin{matrix} a_{111} & a_{121} & a_{131} & a_{141} \\ a_{211} & a_{221} & a_{231} & a_{241} \\ a_{311} & a_{321} & a_{331} & a_{341} \\ a_{411} & a_{421} & a_{431} & a_{441} \end{matrix}}^{z=1} & \bigg| & \overbrace{\begin{matrix} a_{112} & a_{122} & a_{132} & a_{142} \\ a_{212} & a_{222} & a_{232} & a_{242} \\ a_{312} & a_{322} & a_{332} & a_{342} \\ a_{412} & a_{422} & a_{432} & a_{442} \end{matrix}}^{z=2} & \bigg| & \overbrace{\begin{matrix} a_{113} & a_{123} & a_{133} & a_{143} \\ a_{213} & a_{223} & a_{233} & a_{243} \\ a_{313} & a_{323} & a_{333} & a_{343} \\ a_{413} & a_{423} & a_{433} & a_{443} \end{matrix}}^{z=3} \end{bmatrix},$$

$$S = \begin{bmatrix} \overbrace{\begin{matrix} s_{111} & s_{121} & s_{131} & s_{141} \\ s_{211} & s_{221} & s_{231} & s_{241} \\ s_{311} & s_{321} & s_{331} & s_{341} \\ s_{411} & s_{421} & s_{431} & s_{441} \end{matrix}}^{z=1} & \bigg| & \overbrace{\begin{matrix} s_{112} & s_{122} & s_{132} & s_{142} \\ s_{212} & s_{222} & s_{232} & s_{242} \\ s_{312} & s_{322} & s_{332} & s_{342} \\ s_{412} & s_{422} & s_{432} & s_{442} \end{matrix}}^{z=2} & \bigg| & \overbrace{\begin{matrix} s_{113} & s_{123} & s_{133} & s_{143} \\ s_{213} & s_{223} & s_{233} & s_{243} \\ s_{313} & s_{323} & s_{333} & s_{343} \\ s_{413} & s_{423} & s_{433} & s_{443} \end{matrix}}^{z=3} \end{bmatrix},$$

$$B = \begin{bmatrix} \overbrace{\begin{matrix} b_{111} & b_{121} \\ b_{211} & b_{221} \end{matrix}}^{z=1} & \bigg| & \overbrace{\begin{matrix} b_{112} & b_{122} \\ b_{212} & b_{222} \end{matrix}}^{z=2} \end{bmatrix}, \dot{S} = (2, 1, 3), \dot{B} = (1, 1, 1);$$

thus, dimensions $\hat{x} = \lceil(3-1)/2\rceil + \lceil(4-3+1)/2\rceil = 2$, $\hat{y} = \lceil(2-1)/2\rceil + \lceil(4-2+1)/2\rceil = 3$, and $\hat{z} = \lceil(1-1)/2\rceil + \lceil(4-1+1)/2\rceil = 2$; further

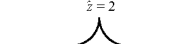

-continued

that shows the block-diffusion in 2×3×2 blocks, but with the data still kept in 4×4×3 bits. And now $\hat{p}_x = \lceil(3-1)/2\rceil + 1 = 2$, $\hat{p}_y = \lceil(2-1)/2\rceil + 1 = 2$, $\hat{p}_z = \lceil(1-1)/2\rceil + 1 = 1$, thus, $$AF(3,2,1) \xrightarrow{\text{block}} \hat{A}F(2,2,1) = \hat{A} \oplus \hat{A}\hat{x}_2 \oplus \hat{A}\hat{y}_2 \oplus \hat{A}\hat{z}_1 \oplus S = A \ldots \oplus$$

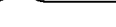

-continued $$\begin{bmatrix} \overbrace{\begin{matrix} 0 & 0 & 0 & 0 \\ 0 & 0 & 0 & 0 \\ 0 & 0 & 0 & 0 \\ 0 & 0 & 0 & 0 \end{matrix}}^{\hat{z}=1} \begin{matrix} 0 & 0 & 0 & 0 \\ 0 & 0 & 0 & 0 \\ 0 & 0 & 0 & 0 \\ 0 & 0 & 0 & 0 \end{matrix} \overbrace{\begin{matrix} a_{111} & a_{121} & a_{131} & a_{141} \\ a_{211} & a_{221} & a_{231} & a_{241} \\ a_{311} & a_{321} & a_{331} & a_{341} \\ a_{411} & a_{421} & a_{431} & a_{441} \end{matrix}}^{\hat{z}=2} \end{bmatrix} \oplus$$

$$\begin{bmatrix} \overbrace{\begin{matrix} 0 & 0 & 0 & 0 \\ 0 & s_{113} & s_{123} & s_{133} \\ 0 & s_{213} & s_{223} & s_{233} \\ 0 & s_{313} & s_{323} & s_{333} \end{matrix}}^{\hat{z}=1} \begin{matrix} 0 & 0 & 0 & 0 \\ 0 & 0 & 0 & 0 \\ 0 & 0 & 0 & 0 \\ 0 & 0 & 0 & 0 \end{matrix} \overbrace{\begin{matrix} 0 & 0 & 0 & 0 \\ 0 & 0 & 0 & 0 \\ 0 & 0 & 0 & 0 \\ 0 & 0 & 0 & 0 \end{matrix}}^{\hat{z}=2} \end{bmatrix}.$$

In detail, $\hat{A}\hat{x}_2$ expresses a series of two dimensional binary matrixes $\hat{A}_{\hat{x}}$ on the axis $\hat{x}$; wherein $\hat{A}\hat{x}_2$ comprises $$\hat{A}_{\hat{x}}(2) = \begin{bmatrix} \overbrace{\begin{matrix} a_{311} & a_{321} & a_{331} & a_{341} \\ a_{411} & a_{421} & a_{431} & a_{441} \end{matrix}}^{\hat{z}=1} & \begin{matrix} a_{312} & a_{322} & a_{332} & a_{342} \\ a_{412} & a_{422} & a_{432} & a_{442} \end{matrix} & \overbrace{\begin{matrix} a_{313} & a_{323} & a_{333} & a_{343} \\ a_{413} & a_{423} & a_{433} & a_{443} \end{matrix}}^{\hat{z}=2} \end{bmatrix}$$

to position 1, and $$\hat{A}_{\hat{x}}(0) = \begin{bmatrix} \overbrace{\begin{matrix} 0 & 0 & 0 & 0 \\ 0 & 0 & 0 & 0 \end{matrix}}^{\hat{z}=1} \begin{matrix} 0 & 0 & 0 & 0 \\ 0 & 0 & 0 & 0 \end{matrix} \overbrace{\begin{matrix} 0 & 0 & 0 & 0 \\ 0 & 0 & 0 & 0 \end{matrix}}^{\hat{z}=2} \end{bmatrix}$$

at position 2.

Furthermore, $\hat{A}\hat{y}_2$ expresses a series of two dimensional binary matrixes $\hat{A}_{\hat{y}}$ on the axis $\hat{y}$; wherein $\hat{A}\hat{y}_2$ comprises $\hat{A}_{\hat{y}}(2)$ to positions 1, 3 is equal to $$\begin{bmatrix} \overbrace{\begin{matrix} a_{121} & a_{131} \\ a_{221} & a_{231} \\ a_{321} & a_{331} \\ a_{421} & a_{431} \end{matrix}}^{\hat{z}=1} \begin{matrix} a_{122} & a_{132} \\ a_{222} & a_{232} \\ a_{322} & a_{332} \\ a_{422} & a_{432} \end{matrix} \overbrace{\begin{matrix} a_{123} & a_{133} \\ a_{223} & a_{233} \\ a_{323} & a_{333} \\ a_{423} & a_{433} \end{matrix}}^{\hat{z}=2} \end{bmatrix}, \text{ and}$$

$$\hat{A}_{\hat{y}}(0) = \begin{bmatrix} \overbrace{\begin{matrix} 0 & 0 \\ 0 & 0 \\ 0 & 0 \\ 0 & 0 \end{matrix}}^{\hat{z}=1} \begin{matrix} 0 & 0 \\ 0 & 0 \\ 0 & 0 \\ 0 & 0 \end{matrix} \overbrace{\begin{matrix} 0 & 0 \\ 0 & 0 \\ 0 & 0 \\ 0 & 0 \end{matrix}}^{\hat{z}=2} \end{bmatrix}$$

at position 2.

Moreover, $\hat{A}\hat{z}_1$ expresses a series of two dimensional binary matrixes $\hat{A}_{\hat{z}}$ on the axis $\hat{z}$; wherein $\hat{A}\hat{z}_1$ comprises $$\hat{A}_{\hat{z}}(1) = \begin{bmatrix} \overbrace{\begin{matrix} a_{111} & a_{121} & a_{131} & a_{141} \\ a_{211} & a_{221} & a_{231} & a_{241} \\ a_{311} & a_{321} & a_{331} & a_{341} \\ a_{411} & a_{421} & a_{431} & a_{441} \end{matrix}}^{\hat{z}=1} \end{bmatrix}$$

to position $$\hat{A}_{\hat{z}}(0) = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

at position 1. Finally, the effective S comes from the overlap between S and A, while $\dot{S}=(2,1,3)$ anchors to $P=(3,2,1)$.

$\hat{A}F(\hat{p}_1, \hat{p}_2^t, \ldots, \dot{p}_n)$: $\hat{A}$ performs the function of block-diffusion, repeated t times.

Example: (a) $\hat{A}F(\hat{p}_1, \hat{p}_2^2, \ldots, \hat{p}_n) = \hat{A}F(\hat{p}_1, \hat{p}_2, \ldots, \hat{p}_n)F(\hat{p}_1, \hat{p}_2, \ldots \hat{p}_n)$ (b) $\hat{A}F(\hat{p}_1, \hat{p}_2^1, \ldots, \hat{p}_n) = \hat{A}F(\hat{p}_1, \hat{p}_2, \ldots, \hat{p}_n)$ (c) $\hat{A}F(\hat{p}_1, \hat{p}_2^0, \ldots, \hat{p}_n) = A$ T: a diffusion-cycle, expresses $\dot{A}F(\hat{p}_1, \hat{p}_2^T, \ldots \dot{p}_n) = A$, wherein $T = 2^{U+1}$, $U = \lceil \log_2 u \rceil$, $u = \max(\lceil d_i/b_i \rceil, 1 \leq i \leq n)$.

Embodiment of Cryptographic Method:

To make it easier to understand the content of the present invention, examples in detail are described as follows:

Suppose a plaintext A: "smoother", its ASCII code is 73 6d 6f 6f 74 68 65 72, the binary format is shown as an 8×8 two-dimensional matrix as in Table 1-1.

TABLE 1-1

| ASCII | | | | | | | |
|---|---|---|---|---|---|---|---|
| 73 | 6d | 6f | 6f | 74 | 68 | 65 | 72 |
| 1 | 1 | 1 | 1 | 0 | 0 | 1 | 0 |
| 1 | 0 | 1 | 1 | 0 | 0 | 0 | 1 |
| 0 | 1 | 1 | 1 | 1 | 0 | 1 | 0 |
| 0 | 1 | 1 | 1 | 0 | 1 | 0 | 0 |
| 1 | 0 | 0 | 0 | 1 | 0 | 0 | 1 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |

Suppose a password: "Yourlips", its ASCII code is 59 6f 75 72 6c 69 70 73. For applying to the plaintext, the ASCII code: first, excludes the last digit 3; second, forms into octal format 26 26 75.65 34 46 61 51 34 07; third, adds 1 to each digit; Table 1-2 shows that the password includes 10 diffusion-centers.

TABLE 1-2

| | ASCII | | | | | | | | | |
|---|---|---|---|---|---|---|---|---|---|---|
| | 26 | 26 | 75 | 65 | 34 | 46 | 61 | 51 | 34 | 07 |
| Row | 3 | 3 | 8 | 7 | 4 | 5 | 7 | 6 | 4 | 1 |
| Column | 7 | 7 | 6 | 6 | 5 | 7 | 2 | 2 | 5 | 8 |

EXAMPLE 1

The Function of Point-Diffusion in 2D

Supposes $$S_{5\times 5} = \begin{bmatrix} 10011 \\ 01101 \\ 10111 \\ 10010 \\ 11101 \end{bmatrix}, \dot{S} = (1, 1);$$

reads every diffusion-center in order, if from 1 to 10 on encryption, then from 10 back to 1 on decryption; counts the diffusion-cycle $T=2^{3+1}=16$, if 1 time on encryption, then 15 times on decryption. In math, inputs the plaintext A, then runs $A^1, A_1^1, \ldots A_9^1$ and outputs $A_1, A_2, \ldots A_{10}$ during encryption; inputs the ciphertext $A_{10}$, then runs $A_{10}^{15}, A_9^{15}, \ldots A_1^{15}$ and outputs $A_9, \ldots, A_1, A$ during decryption. The details on the order 1, 5, 10 are shown as below, $A_{d_i}(0)$ marked in boldface. Encryption at the $1^{st}$ Diffusion-Center (3,7):

$$A^1 = AF(3, 7)$$

$$= A \oplus Ax_3 \oplus Ay_7 \oplus S$$

$$= \begin{bmatrix} 11110010 \\ 10110001 \\ 01111010 \\ 01110100 \\ 10001001 \\ 11111111 \\ 11111111 \\ 00000000 \end{bmatrix} \oplus \begin{bmatrix} 10110001 \\ 01111010 \\ 00000000 \\ 01111010 \\ 01110100 \\ 10001001 \\ 11111111 \\ 11111111 \end{bmatrix} \oplus \begin{bmatrix} 11100101 \\ 01100000 \\ 11110101 \\ 11101000 \\ 00010000 \\ 11111101 \\ 11111101 \\ 00000000 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

$$= \begin{bmatrix} 10100110 \\ 10101011 \\ 10001101 \\ 11100111 \\ 11101111 \\ 10001001 \\ 11111110 \\ 11111111 \end{bmatrix} = A_1.$$

Encryption at the $5^{th}$ Diffusion-Center (4,5):

$$A_4^1 = A_4 F(4, 5)$$

$$= A_4 \oplus A_4 x_4 \oplus A_4 y_5 \oplus S$$

$$= \begin{bmatrix} 11010111 \\ 00010101 \\ 00010001 \\ 01000011 \\ 00001111 \\ 01011001 \\ 10101011 \\ 01100101 \end{bmatrix} \oplus \begin{bmatrix} 00010101 \\ 00010001 \\ 01000011 \\ 00000000 \\ 01000011 \\ 00001111 \\ 01011001 \\ 10101011 \end{bmatrix} \oplus \begin{bmatrix} 10100011 \\ 00100010 \\ 00100000 \\ 10000001 \\ 00010111 \\ 10110100 \\ 01010101 \\ 11000010 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 01100001 \\ 00100110 \\ 01110010 \\ 11001011 \\ 01011101 \\ 11101001 \\ 10101110 \\ 00000010 \end{bmatrix} = A_5.$$

Encryption at the $10^{th}$ Diffusion-Center (1,8):

$$A_9^1 = A_9 F(1, 8) = A_9 \oplus A_9 x_1 \oplus A_9 y_8 \oplus S$$

$$= \begin{bmatrix} 01110011 \\ 10000110 \\ 10011100 \\ 10101100 \\ 01000101 \\ 10001011 \\ 00110101 \\ 10101001 \end{bmatrix} \oplus \begin{bmatrix} 00000000 \\ 01110011 \\ 10000110 \\ 10011100 \\ 10101100 \\ 01000101 \\ 10001011 \\ 00110101 \end{bmatrix} \oplus \begin{bmatrix} 11100110 \\ 00001100 \\ 00111000 \\ 01011000 \\ 10001010 \\ 00010110 \\ 01101010 \\ 01010010 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 10010100 \\ 11111001 \\ 00100011 \\ 01101001 \\ 01100010 \\ 11011000 \\ 11010100 \\ 11001110 \end{bmatrix} = A_{10}.$$

Decryption at the $10^{th}$ Diffusion-Center (1,8):

$$A_{10}^{15} = A_{10}^{14} F(1, 8) = A_{10}^{14} \oplus A_{10}^{14} x_1 \oplus A_{10}^{14} y_8 \oplus S$$

$$= \begin{bmatrix} 00101110 \\ 10011000 \\ 00000011 \\ 10011010 \\ 01001010 \\ 10111111 \\ 10000110 \\ 11100101 \end{bmatrix} \oplus \begin{bmatrix} 00000000 \\ 00101110 \\ 10011000 \\ 00000011 \\ 10011010 \\ 01001010 \\ 10111111 \\ 10000110 \end{bmatrix} \oplus \begin{bmatrix} 01011100 \\ 00110000 \\ 00000110 \\ 00110100 \\ 10010010 \\ 01111110 \\ 00001100 \\ 11001010 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 01110011 \\ 10000110 \\ 10011100 \\ 10101100 \\ 01000101 \\ 10001011 \\ 00110101 \\ 10101001 \end{bmatrix} = A_9.$$

Decryption at the $5^{th}$ Diffusion-Center (4,5):

$$A_5^{15} = A_5^{14} F(4, 5) = A_5^{14} \oplus A_5^{14} x_4 \oplus A_5^{14} y_5 \oplus S$$

$$= \begin{bmatrix} 00011010 \\ 11111000 \\ 00011001 \\ 00111100 \\ 00010110 \\ 11000111 \\ 00100110 \\ 00111001 \end{bmatrix} \oplus \begin{bmatrix} 11111000 \\ 00011001 \\ 00111100 \\ 00000000 \\ 00111100 \\ 00010110 \\ 11000111 \\ 00100110 \end{bmatrix} \oplus \begin{bmatrix} 00110101 \\ 11110100 \\ 00110100 \\ 01110110 \\ 00100011 \\ 10000011 \\ 01000011 \\ 01110100 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 11010111 \\ 00010101 \\ 00010001 \\ 01000011 \\ 00001111 \\ 01011001 \\ 10101011 \\ 01100101 \end{bmatrix} = A_4.$$

Decryption at the $1^{st}$ Diffusion-Center (3,7):

$$A_1^{15} = A_1^{14} F(3, 7) = A_1^{14} \oplus A_1^{14} x_3 \oplus A_1^{14} y_7 \oplus S$$

$$= \begin{bmatrix} 11010110 \\ 10001001 \\ 00101000 \\ 00110101 \\ 01101011 \\ 01110011 \\ 01111010 \\ 11010111 \end{bmatrix} \oplus \begin{bmatrix} 10001001 \\ 00101000 \\ 00000000 \\ 00101000 \\ 00110101 \\ 01101011 \\ 01110011 \\ 01111010 \end{bmatrix} \oplus \begin{bmatrix} 10101101 \\ 00010000 \\ 01010000 \\ 01101000 \\ 11010110 \\ 11100101 \\ 11110101 \\ 10101101 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

-continued $$= \begin{bmatrix} 11110010 \\ 10110001 \\ 01111010 \\ 01110100 \\ 10001001 \\ 11111111 \\ 11111111 \\ 00000000 \end{bmatrix} = A.$$

EXAMPLE 2

The Function of Block-Diffusion in 2D

Supposes that $$S_{5\times 5} = \begin{bmatrix} 10011 \\ 01101 \\ 10111 \\ 10010 \\ 11101 \end{bmatrix}, \dot{S} = (1, 1),$$

$$B_{2\times 2} = \begin{bmatrix} b_{11} & b_{12} \\ b_{21} & b_{22} \end{bmatrix}, \dot{B} = (1, 1);$$

reads
every diffusion-center in order, if from 1 to 10 on encryption, then from 10 back to 1 on decryption; counts the diffusion-cycle $T=2^{2+1}=8$, since $d_i/b_i=4=2^2$, and if 1 time on encryption, then 7 times on decryption. In math, inputs the plaintext A, then runs $\hat{A}^1, \hat{A}_1^1, \ldots \hat{A}_9^1$, and outputs $A_1, A_2, \ldots A_{10}$ during encryption; inputs the ciphertext $A_{10}$, then runs $\hat{A}_{10}^7, \hat{A}_9^7, \ldots \hat{A}_1^7$ and outputs $A_9, \ldots, A_1, A$ during decryption. The details on the order 1, 5, 10 are shown as below, $$\hat{A}_{d_i}(0)$$

marked in boldface.

Encryption at the $1^{st}$ Diffusion-Center (3,7):

$$\hat{A}^1 = \hat{A} F(2, 4) =$$

$$= \hat{A} \oplus \hat{A}\hat{x}_2 \oplus \hat{A}\hat{y}_4 \oplus S (\because \hat{p}_x = \lceil (3-1)/2 \rceil + 1, \hat{p}_y$$

$$= \lceil (7-1)/2 \rceil + 1)$$

$$= \begin{bmatrix} 11110010 \\ 10110001 \\ 01111010 \\ 01110100 \\ 10001001 \\ 11111111 \\ 11111111 \\ 00000000 \end{bmatrix} \oplus \begin{bmatrix} 01111010 \\ 01110100 \\ 00000000 \\ 00000000 \\ 01111010 \\ 01110100 \\ 10001001 \\ 11111111 \end{bmatrix} \oplus \begin{bmatrix} 11001000 \\ 11000100 \\ 11101000 \\ 11010000 \\ 00100100 \\ 11111100 \\ 11111100 \\ 00000000 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

$$\begin{bmatrix} 01000000 \\ 00000001 \\ 10010000 \\ 10100101 \\ 11010101 \\ 01110101 \\ 10001001 \\ 11111111 \end{bmatrix} = A_1.$$

Encryption at the 5$^{th}$ Diffusion-Center (4,5):

$$\hat{A}_4^1 = \hat{A}_4 F(3, 3)$$

$$= \hat{A}_4 \oplus \hat{A}_4 \hat{x}_3 \oplus \hat{A}_4 \hat{y}_3 \oplus S(\because \hat{p}_x = \lceil (4-1)/2 \rceil + 1, \hat{p}_y = \lceil (5-1)/2 \rceil + 1)$$

$$= \begin{bmatrix} 11000011 \\ 10100110 \\ 10001001 \\ 01000110 \\ 00110011 \\ 01100010 \\ 11011111 \\ 00000000 \end{bmatrix} \oplus \begin{bmatrix} 10001001 \\ 01000110 \\ 00110011 \\ 00000000 \\ 00000000 \\ 01000110 \\ 00110011 \\ 01100010 \end{bmatrix} \oplus \begin{bmatrix} 00000000 \\ 10010001 \\ 00100010 \\ 00010001 \\ 11000000 \\ 10000000 \\ 01110011 \\ 00000000 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 01001010 \\ 01110001 \\ 10011000 \\ 01011110 \\ 11110101 \\ 10101111 \\ 10010110 \\ 01101100 \end{bmatrix}$$

$$= A_5.$$

Encryption at the 10$^{th}$ Diffusion-Center (1,8): (☐, Zero in $A_{\hat{y}}$, (5), 2$^{nd}$ Col.)

$$\hat{A}_9^1 = \hat{A}_9 F(1, 5)$$

$$= \hat{A}_9 \oplus \hat{A}_9 \hat{x}_1 \oplus \hat{A}_9 \hat{y}_5 \oplus S(\because \hat{p}_x = \lceil (1-1)/2 \rceil + 1, \hat{p}_y = \lceil (8-1)/2 \rceil + 1)$$

$$= \begin{bmatrix} 10011001 \\ 11110100 \\ 10001001 \\ 10001000 \\ 11011000 \\ 10000001 \\ 01110101 \\ 10011001 \end{bmatrix} \oplus \begin{bmatrix} 00000000 \\ 00000000 \\ 10011001 \\ 11110100 \\ 10001000 \\ 00010011 \\ 11011000 \\ 10000001 \end{bmatrix} \oplus \begin{bmatrix} 01100100 \\ 11010000 \\ 00100000 \\ 01001100 \\ 01100000 \\ 00000100 \\ 11010100 \\ 01100100 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 11111100 \\ 00100100 \\ 00110000 \\ 10101010 \\ 00110001 \\ 10010110 \\ 01111001 \\ 01111100 \end{bmatrix}$$

$$= A_{10}.$$

Decryption at the 10$^{th}$ Diffusion-Center (1,8):

$$\hat{A}_{10}^7 = \hat{A}_{10}^6 F(1, 5)$$

$$= \hat{A}_{10}^6 \oplus \hat{A}_{10}^6 \hat{x}_1 \oplus \hat{A}_{10}^6 \hat{y}_5 \oplus$$

$$S(\because \hat{p}_x = \lceil (1-1)/2 \rceil + 1, \hat{p}_y = \lceil (8-1)/2 \rceil + 1)$$

$$= \begin{bmatrix} 01111000 \\ 01100100 \\ 01100101 \\ 01001110 \\ 10001100 \\ 11000011 \\ 11001101 \\ 00010010 \end{bmatrix} \oplus \begin{bmatrix} 00000000 \\ 00000000 \\ 01111000 \\ 01100100 \\ 01100101 \\ 01001110 \\ 10001100 \\ 11000011 \end{bmatrix} \oplus \begin{bmatrix} 11100000 \\ 10010000 \\ 10010100 \\ 00111000 \\ 00110000 \\ 00001100 \\ 00110100 \\ 01001000 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 10011001 \\ 11110100 \\ 10001000 \\ 00010011 \\ 11011000 \\ 10000001 \\ 01110101 \\ 10011001 \end{bmatrix}$$

$$= A_9.$$

Decryption at the 5$^{th}$ diffusion-center (4,5):

$$\hat{A}_5^7 = \hat{A}_5^6 F(3, 3)$$

$$= \hat{A}_5^6 \oplus \hat{A}_5^6 \hat{x}_3 \oplus \hat{A}_5^6 \hat{y}_3 \oplus S(\because \hat{p}_x = \lceil (4-1)/2 \rceil + 1, \hat{p}_y = \lceil (5-1)/2 \rceil + 1)$$

$$= \begin{bmatrix} 00101110 \\ 11111000 \\ 01011110 \\ 10111100 \\ 10100100 \\ 11000100 \\ 10110010 \\ 01101000 \end{bmatrix} \oplus \begin{bmatrix} 01011110 \\ 10111100 \\ 10100100 \\ 00000000 \\ 00000000 \\ 10111100 \\ 10100100 \\ 11000000 \end{bmatrix} \oplus \begin{bmatrix} 10110011 \\ 11100010 \\ 01110011 \\ 11110011 \\ 10010001 \\ 00010001 \\ 11000000 \\ 10100010 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 11000011 \\ 10100110 \\ 10001001 \\ 01000110 \\ 00110011 \\ 01100010 \\ 11011111 \\ 00000000 \end{bmatrix}$$

$$= A_4.$$

Decryption at the 1$^{st}$ Diffusion-Center (3,7):

$$\hat{A}_1^7 = \hat{A}_1^6 F(2, 4)$$

$$= \hat{A}_1^6 \oplus \hat{A}_1^6 \hat{x}_2 \oplus \hat{A}_1^6 \hat{y}_4 \oplus S(\because \hat{p}_x = \lceil (3-1)/2 \rceil + 1, \hat{p}_y = \lceil (7-1)/2 \rceil + 1)$$

-continued $$= \begin{bmatrix} 01100010 \\ 00000000 \\ 00011000 \\ 10110001 \\ 00101111 \\ 10111100 \\ 01101111 \\ 10001100 \end{bmatrix} \oplus \begin{bmatrix} 00011000 \\ 10110001 \\ 00000000 \\ 00000000 \\ 00011000 \\ 10110001 \\ 00101111 \\ 10111100 \end{bmatrix} \oplus \begin{bmatrix} 10001000 \\ 00000000 \\ 01100000 \\ 11000100 \\ 10111100 \\ 11110000 \\ 10111100 \\ 00110000 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

$$= \begin{bmatrix} 11110010 \\ 10110001 \\ 01111010 \\ 01110100 \\ 10001001 \\ 11111111 \\ 11111111 \\ 00000000 \end{bmatrix}$$

$= A.$

EXAMPLE 3

The Functions of Point-Diffusion and Block-Diffusion in 2D

Supposes $$S_{5 \times 5} = \begin{bmatrix} 10011 \\ 01101 \\ 10111 \\ 10010 \\ 11101 \end{bmatrix},$$

$\dot{S} = (1, 1),$ $B_{2 \times 2} = \begin{bmatrix} b_{11} & b_{12} \\ b_{21} & b_{22} \end{bmatrix},$ $\dot{B} = (1, 1);$ selects a switch set $Y=[1011011101]$; reads every diffusion-center and Y element in order, if from 1 to 10 on encryption, then from 10 back to 1 on decryption; counts the diffusion-cycle, if Y element is 1, then $T=2^{3+1}=16$ with point-diffusion, otherwise, $T=2^{2+1}=8$ with block-diffusion, and if 1 time on encryption, then 15 or 7 times on decryption.

In math, inputs the plaintext A, then runs $A^1, \hat{A}_1^1, A_2^1, A_3^1, \hat{A}_4^1, A_5^1, A_6^1, A_7^1, \hat{A}_8^1, A_9^1$ and outputs $A_1, A_2, \ldots, A_9, A_{10}$ during encryption; inputs the ciphertext $A_{10}$, then runs $A_{10}^{15}, \hat{A}_9^7, \hat{A}_8^{15}, A_7^{15}, A_6^{15}, \hat{A}_5^7, A_4^{15}, A_3^{15}, \hat{A}_2^7, A_1^{15}$ and outputs $A_9, A_8, \ldots, A_1, A$ during decryption. The details on the order 1, 5, 10 are shown as below, $A_{d_i}(0)$ and $\hat{A}_{d_i}(0)$ marked in boldface.

Encryption at the 1$^{st}$ Diffusion-Center (3,7): Y(1)=1, Point-Diffusion.

$A^1 = AF(3, 7)$ $= A \oplus Ax_3 \oplus Ay_7 \oplus S$ $$= \begin{bmatrix} 11110010 \\ 10110001 \\ 01111010 \\ 01110100 \\ 10001001 \\ 11111111 \\ 11111111 \\ 00000000 \end{bmatrix} \oplus \begin{bmatrix} 10110001 \\ 01111010 \\ 00000000 \\ 01111010 \\ 01110100 \\ 10001001 \\ 11111111 \\ 11111111 \end{bmatrix} \oplus \begin{bmatrix} 11100101 \\ 01100000 \\ 11110101 \\ 11101000 \\ 00010000 \\ 11111101 \\ 11111101 \\ 00000000 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

$$= \begin{bmatrix} 10100110 \\ 10101011 \\ 10001101 \\ 11100111 \\ 11101111 \\ 10001001 \\ 11111110 \\ 11111111 \end{bmatrix}$$

$= A_1$

Encryption at the 5$^{th}$ Diffusion-Center (4,5): Y(5)=0, Block-Diffusion.

$\hat{A}_4^1 = \hat{A}_4 F(3, 3)$ $= \hat{A}_4 \oplus A_4 \hat{x}_3 \oplus \hat{A}_4 \hat{y}_3 \oplus S (\because \hat{p}_x = \lceil (4-1)/2 \rceil + 1, \hat{p}_y = \lceil (5-1)/2 \rceil + 1)$ $$= \begin{bmatrix} 11001000 \\ 00011010 \\ 10000111 \\ 11010010 \\ 01000111 \\ 11100010 \\ 11010101 \\ 00010110 \end{bmatrix} \oplus \begin{bmatrix} 10000111 \\ 11010010 \\ 01000111 \\ 00000000 \\ 00000000 \\ 11010010 \\ 01000111 \\ 11100010 \end{bmatrix} \oplus \begin{bmatrix} 00100010 \\ 01100010 \\ 00010001 \\ 01000000 \\ 00010001 \\ 10000000 \\ 01010001 \\ 01010001 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 01101101 \\ 10101010 \\ 11010001 \\ 10011011 \\ 01010000 \\ 10111011 \\ 11001010 \\ 10101011 \end{bmatrix}$$

$= A_5$

Encryption at the 10$^{th}$ Diffusion-Center (1,8): Y(10)=1, Point-Diffusion.

$A_9^1 = A_9 F(1, 8)$ $= A_9 \oplus A_9 x_1 \oplus A_9 y_8 \oplus S$ $$= \begin{bmatrix} 00110000 \\ 11000111 \\ 00001010 \\ 10000100 \\ 00101100 \\ 11110100 \\ 00000111 \\ 10011011 \end{bmatrix} \oplus \begin{bmatrix} 00000000 \\ 00110000 \\ 11000111 \\ 00001010 \\ 10000100 \\ 00101100 \\ 11110100 \\ 00000111 \end{bmatrix} \oplus \begin{bmatrix} 01100000 \\ 10001110 \\ 00010100 \\ 00001000 \\ 01011000 \\ 11101000 \\ 00001110 \\ 00110110 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 01010001 \\ 01111001 \\ 11011000 \\ 10000111 \\ 11110001 \\ 00110000 \\ 11111101 \\ 10101010 \end{bmatrix}$$

$$= A_{10}$$

Decryption at the $10^{th}$ Diffusion-Center (1,8): Y(10)=1, Point-Diffusion.

$$A_{10}^{15} = A_{10}^{14} F(1, 8)$$

$$= A_{10}^{14} \oplus A_{10}^{14} x_1 \oplus A_{10}^{14} y_8 \oplus S$$

$$= \begin{bmatrix} 11101111 \\ 00011000 \\ 11110001 \\ 00101100 \\ 11111111 \\ 11111001 \\ 10101010 \\ 11101111 \end{bmatrix} \oplus \begin{bmatrix} 00000000 \\ 11101111 \\ 00011000 \\ 11110001 \\ 00101100 \\ 11111111 \\ 11111001 \\ 10101010 \end{bmatrix} \oplus \begin{bmatrix} 11011110 \\ 00110000 \\ 11100010 \\ 01011000 \\ 11111110 \\ 11110010 \\ 01010100 \\ 11011110 \end{bmatrix} \oplus \begin{bmatrix} 00000001 \\ 00000000 \\ 00000001 \\ 00000001 \\ 00000001 \\ 00000000 \\ 00000000 \\ 00000000 \end{bmatrix}$$

$$= \begin{bmatrix} 00110000 \\ 11000111 \\ 00001010 \\ 10000100 \\ 00101100 \\ 11110100 \\ 00000111 \\ 10011011 \end{bmatrix}$$

$$= A_9$$

Decryption at the $5^{th}$ Diffusion-Center (4,5): Y(5)=0, Block-Diffusion.

$$\hat{A}_5^7 = \hat{A}_5^6 F(3, 3)$$

$$= \hat{A}_5^6 \oplus \hat{A}_5^6 \hat{x}_3 \oplus \hat{A}_5^6 \hat{y}_3 \oplus S (\because \hat{p}_x = \lceil (4-1)/2 \rceil + 1, \hat{p}_y = \lceil (5-1)/2 \rceil + 1)$$

$$= \begin{bmatrix} 11101100 \\ 10100011 \\ 10010111 \\ 00111001 \\ 01000111 \\ 10010000 \\ 00101110 \\ 00101010 \end{bmatrix} \oplus \begin{bmatrix} 10010111 \\ 00111001 \\ 01000001 \\ 00000000 \\ 00000000 \\ 00111001 \\ 01000001 \\ 10010000 \end{bmatrix} \oplus \begin{bmatrix} 10110011 \\ 10000000 \\ 01010001 \\ 11100010 \\ 00000000 \\ 01000000 \\ 10110011 \\ 10100010 \end{bmatrix} \oplus \begin{bmatrix} 00000000 \\ 00000000 \\ 00000000 \\ 00001001 \\ 00000110 \\ 00001011 \\ 00001001 \\ 00001110 \end{bmatrix}$$

$$= \begin{bmatrix} 11001000 \\ 00011010 \\ 10000111 \\ 11010010 \\ 01000111 \\ 11100010 \\ 11010101 \\ 00010110 \end{bmatrix}$$

$$= A_4$$

Decryption at the $1^{st}$ Diffusion-Center (3,7): Y(1)=1, Point-Diffusion.

$$A_1^{15} = A_1^{14} F(3, 7)$$

$$= A_1^{14} \oplus A_1^{14} x_3 \oplus A_1^{14} y_7 \oplus S$$

$$= \begin{bmatrix} 11010110 \\ 10001001 \\ 00101000 \\ 00110101 \\ 01101011 \\ 01110011 \\ 01111010 \\ 11010111 \end{bmatrix} \oplus \begin{bmatrix} 10001001 \\ 00101000 \\ 00000000 \\ 00101000 \\ 00110101 \\ 01101011 \\ 01110011 \\ 01111010 \end{bmatrix} \oplus \begin{bmatrix} 10101101 \\ 00010000 \\ 01010000 \\ 01101000 \\ 11010101 \\ 11100101 \\ 11110101 \\ 10101101 \end{bmatrix} \oplus \begin{bmatrix} 00000000 \\ 00000000 \\ 00000010 \\ 00000001 \\ 00000010 \\ 00000010 \\ 00000011 \\ 00000000 \end{bmatrix}$$

$$= \begin{bmatrix} 11110010 \\ 10110001 \\ 01111010 \\ 01110100 \\ 10001001 \\ 11111111 \\ 11111111 \\ 00000000 \end{bmatrix}$$

$$= A$$

EXAMPLE 4

The Function of Point-Diffusion in 3D

Supposes a plaintext A: let Table 1-1 overlap for 8 times to shape a 8×8×8 binary matrix, shown as a 8×8 matrix in ASCII code format as in Table 2-1. To figure out the later 3D calculation clearly with Table 2-1, the row stands for a x-y plane, namely Table 1-1, and all rows resolve as the axis z.

TABLE 2-1

| 73 | 6d | 6f | 6f | 74 | 68 | 65 | 72 |
|---|---|---|---|---|---|---|---|
| 73 | 6d | 6f | 6f | 74 | 68 | 65 | 72 |
| 73 | 6d | 6f | 6f | 74 | 68 | 65 | 72 |
| 73 | 6d | 6f | 6f | 74 | 68 | 65 | 72 |

TABLE 2-1-continued

| 73 | 6d | 6f | 6f | 74 | 68 | 65 | 72 |
|----|----|----|----|----|----|----|----|
| 73 | 6d | 6f | 6f | 74 | 68 | 65 | 72 |
| 73 | 6d | 6f | 6f | 74 | 68 | 65 | 72 |
| 73 | 6d | 6f | 6f | 74 | 68 | 65 | 72 |

Suppose a password: "YourlipsY", its ASCII code is 59 6f 75 72 6c 69 70 73 59. For applying to the plaintext, the ASCII code: first, subtracts 8 if a digit >7 and leaves 51 67 75 72 64 61 70 73 51; second, every three-digit forms a division; third, adds 1 to each digit; Table 2-2 shows that the password includes 6 diffusion-centers.

TABLE 2-2

|  | ASCII | | | | | |
|---|---|---|---|---|---|---|
|  | 516 | 775 | 726 | 461 | 707 | 351 |
| First Dimension | 6 | 8 | 8 | 5 | 8 | 4 |
| Second Dimension | 2 | 8 | 3 | 7 | 1 | 6 |
| Third Dimension | 7 | 6 | 7 | 2 | 8 | 2 |

Supposes $S_{1 \times 1 \times 1}=1$, $\dot{S}=(1,1,1)$; reads every diffusion-center in order, if from 1 to 6 on encryption, then from 6 back to 1 on decryption; counts the diffusion-cycle $T=2^{3+1}=16$, if 1 time on encryption, then 15 times on decryption. In math, inputs the plaintext A, then runs $A^1, A_1^{\ 1}, \ldots A_5^{\ 1}$ and outputs $A_1, A_2, \ldots A_6$ during encryption; inputs the ciphertext $A_6$, then runs $A_6^{\ 15}, A_5^{\ 15}, \ldots A_1^{\ 15}$ and outputs $A_5, \ldots, A_1, A$ during decryption. The details on the order 1, 6 are shown as below, $A_{d_i}(0)$ marked in boldface.

Encryption at the $1^{st}$ Diffusion-Center (6,2,7):

$$A^1 = AF(6,2,7) = A \oplus Ax_6 \oplus Ay_2 \oplus Az_7 \oplus S = A_1;$$

Considering that the row of Table 2-1 means a x-y plane, it can be figured out by the 3D scheme through rearranging every plane then placing to the corresponding row of 2D table, as $Ax_6$ and $Ay_2$ as follows.

$$\text{a plane of } Ax_6 = \begin{bmatrix} 10110001 \\ 01111010 \\ 01110100 \\ 10001001 \\ 11111111 \\ 00000000 \\ 11111111 \\ 11111111 \end{bmatrix},$$

$$Ax_6 = \begin{bmatrix} d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \\ d9 & d6 & d7 & d7 & da & d4 & d2 & d9 \end{bmatrix};$$

$$\text{a plane of } Ay_2 = \begin{bmatrix} 10111001 \\ 00011000 \\ 10111101 \\ 10111010 \\ 00000000 \\ 10111111 \\ 10111111 \\ 00000000 \end{bmatrix},$$

$$Ay_2 = \begin{bmatrix} 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \\ 6d & 00 & 6d & 6f & 6f & 74 & 68 & 65 \end{bmatrix};$$

In addition, S is anchored to position (6,2,7), see below, value 1 found at $p_x=6$, $p_y=2$ on the $7^{th}$ plane ($p_z=7$).

$$\text{the } 7^{th} \text{ plane of } S = \begin{bmatrix} 00000000 \\ 00000000 \\ 00000000 \\ 00000000 \\ 00000000 \\ 01000000 \\ 00000000 \\ 00000000 \end{bmatrix},$$

$$S = \begin{bmatrix} 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 20 & 00 & 00 & 00 & 00 & 00 & 00 \\ 00 & 00 & 00 & 00 & 00 & 00 & 00 & 00 \end{bmatrix}.$$

Encryption at the $6^{th}$ Diffusion-Center (4,6,2):

$$A_5 F(4,6,2) = A_5 \oplus A_5 x_4 \oplus A_5 y_6 \oplus A_5 z_2 \oplus S = A_6;$$

$$A_5 = \begin{bmatrix} c4 & 11 & 3a & b7 & 7a & 64 & 01 & ed \\ 8f & c0 & 8e & 8d & a1 & b7 & cb & 00 \\ 53 & 9c & 48 & 26 & ee & eb & 8b & 23 \\ 5b & 5b & 27 & 47 & 91 & b1 & 5c & cb \\ b8 & 34 & 67 & 4a & 9f & b3 & 74 & 4c \\ 92 & 17 & 5d & 5a & 7e & 7d & 84 & 0f \\ a0 & 19 & 5d & e6 & 48 & 7a & 82 & c3 \\ bf & ac & 38 & df & 13 & 2f & d8 & 1a \end{bmatrix};$$

-continued $$A_5 z_2 = \begin{bmatrix} 8f & c0 & 8e & 8d & a1 & b7 & cb & 00 \\ 00 & 00 & 00 & 00 & 00 & 00 & 00 & 00 \\ 8f & c0 & 8e & 8d & a1 & b7 & cb & 00 \\ 53 & 9c & 48 & 26 & ee & eb & 8b & 23 \\ 5b & 5b & 27 & 47 & 91 & b1 & 5c & cb \\ b8 & 34 & 67 & 4a & 9f & b3 & 74 & 4c \\ 92 & 17 & 5d & 5a & 7e & 7d & 84 & 0f \\ a0 & 19 & 5d & e6 & 48 & 7a & 82 & c3 \end{bmatrix};$$

$$A_5 x_4 = \begin{bmatrix} 82 & 20 & 75 & 63 & f5 & c2 & 00 & d6 \\ 17 & 80 & 17 & 16 & 40 & 63 & 95 & 00 \\ a1 & 36 & 94 & 43 & d7 & d5 & 15 & 41 \\ b5 & b5 & 43 & 83 & 20 & 60 & b6 & 95 \\ 74 & 62 & c3 & 95 & 37 & 61 & e2 & 96 \\ 21 & 23 & b6 & b5 & f7 & f6 & 02 & 17 \\ 40 & 34 & b6 & c3 & 94 & f5 & 01 & 81 \\ 77 & 56 & 74 & b7 & 21 & 57 & b4 & 35 \end{bmatrix};$$

$$S = \begin{bmatrix} 00 & 00 & 00 & 00 & 00 & 00 & 00 & 00 \\ 00 & 00 & 00 & 00 & 00 & 08 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \end{bmatrix};$$

$$A_5 y_6 = \begin{bmatrix} 11 & 3a & b7 & 7a & 64 & 00 & 64 & 01 \\ c0 & 8e & 8d & a1 & b7 & 00 & b7 & cb \\ 9c & 48 & 26 & ee & eb & 00 & eb & 8b \\ 5b & 27 & 47 & 91 & b1 & 00 & b1 & 5c \\ 34 & 67 & 4a & 9f & b3 & 00 & b3 & 74 \\ 17 & 5d & 5a & 7e & 7d & 00 & 7d & 84 \\ 19 & 5d & e6 & 48 & 7a & 00 & 7a & 82 \\ ac & 38 & df & 13 & 2f & 00 & 2f & d8 \end{bmatrix};$$

$$A_6 = \begin{bmatrix} d8 & cb & 76 & 23 & 4a & 11 & ae & 3a \\ 58 & ce & 14 & 3a & 56 & dc & e9 & cb \\ e1 & 22 & 74 & 06 & 73 & 89 & be & e9 \\ e6 & 55 & 6b & 73 & ee & 3a & d0 & 21 \\ a3 & 6a & c9 & 07 & 8a & 63 & 79 & 65 \\ 1c & 5d & d6 & db & 6b & 38 & 8f & d0 \\ 6b & 67 & 50 & 37 & d8 & f2 & 7d & cf \\ c4 & db & ce & 9d & 55 & 02 & c1 & 34 \end{bmatrix}.$$

Decryption at the $6^{th}$ Diffusion-Center (4,6,2):

$$A_6^{15} = A_6^{14} F(4, 6, 2) = A_6^{14} \oplus A_6^{14} x_4 \oplus A_6^{14} y_6 \oplus A_6^{14} z_2 \oplus S = A_5;$$

$$A_6^{14} = \begin{bmatrix} 24 & 31 & 7d & 3a & e8 & fb & 8d & c1 \\ 93 & 3d & 8b & 10 & a1 & 6a & 61 & 21 \\ a6 & 25 & c6 & 86 & ee & 81 & d0 & 4a \\ 47 & 39 & 33 & b3 & 91 & 10 & 71 & 50 \\ 50 & 0f & 15 & 63 & 9f & 62 & 25 & ee \\ c6 & 87 & 9c & e2 & 7e & 0a & 9d & 28 \\ 9f & ce & c7 & 85 & 48 & d0 & ba & 31 \\ 3c & 6a & dd & 94 & 13 & aa & bf & 77 \end{bmatrix};$$

$$A_6^{14} x_4 = \begin{bmatrix} 42 & 60 & f6 & 75 & d4 & f5 & 16 & 80 \\ 21 & 76 & 15 & 20 & 76 & d5 & c0 & 40 \\ 43 & 42 & 83 & 03 & 61 & 00 & b6 & 95 \\ 83 & 74 & 61 & 61 & 21 & 20 & e0 & a0 \\ a0 & 17 & 22 & c1 & b5 & c1 & 42 & d7 \\ 83 & 03 & 36 & c1 & 35 & 15 & 36 & 54 \\ 37 & 97 & 83 & 02 & 01 & a0 & 75 & 60 \\ 76 & d5 & b6 & 22 & d6 & 55 & 77 & e3 \end{bmatrix};$$

$$A_6^{14} y_6 = \begin{bmatrix} 31 & 7d & 3a & e8 & fb & 00 & fb & 8d \\ 3d & 8b & 10 & bd & 6a & 00 & 6a & 61 \\ 25 & c6 & 86 & b3 & 81 & 00 & 81 & dd \\ 39 & 33 & b3 & 13 & 10 & 00 & 10 & 71 \\ 0f & 15 & 63 & 5b & 62 & 00 & 62 & 25 \\ 87 & 9c & e2 & 1a & 0a & 00 & 0a & 9d \\ ce & c7 & 85 & 83 & d0 & 00 & d0 & ba \\ 6a & dd & 94 & ec & aa & 00 & aa & bf \end{bmatrix};$$

$$A_6^{14} z_2 = \begin{bmatrix} 93 & 3d & 8b & 10 & bd & 6a & 61 & 21 \\ 00 & 00 & 00 & 00 & 00 & 00 & 00 & 00 \\ 93 & 3d & 8b & 10 & bd & 6a & 61 & 21 \\ a6 & 25 & c6 & 86 & b3 & 81 & dd & 4a \\ 47 & 39 & 33 & b3 & 13 & 10 & 71 & 50 \\ 50 & 0f & 15 & 63 & 5b & 62 & 25 & ee \\ c6 & 87 & 9c & e2 & 1a & 0a & 9d & 28 \\ 9f & ce & c7 & 85 & 83 & d0 & ba & 31 \end{bmatrix};$$

Decryption at the $1^{st}$ Diffusion-Center (6,2,7):

$$A_1^{15} = A_1^{14} F(6, 2, 7) = A_1^{14} \oplus A_1^{14} x_6 \oplus A_1^{14} y_2 \oplus A_1^{14} z_7 \oplus S = A.$$

$$A_1^{14} = \begin{bmatrix} 53 & 1d & 4f & 6e & 77 & 6e & e8 & 28 \\ b4 & 7e & ba & 99 & b6 & a6 & 37 & e6 \\ e3 & cc & f6 & 40 & 00 & 2b & af & 70 \\ 8d & 27 & 8e & 59 & 34 & 16 & b6 & 75 \\ df & 19 & c1 & 34 & 43 & 41 & 9e & 6b \\ 3a & 78 & 37 & c0 & 82 & ea & b5 & 52 \\ 6c & c9 & 7b & 18 & 37 & d5 & 60 & 1c \\ 3a & 78 & 37 & c0 & 82 & ea & b5 & 52 \end{bmatrix};$$

-continued $$A_1^{14}x_6 = \begin{bmatrix} 89 & 0e & 87 & d7 & db & d7 & d4 & 54 \\ 5a & df & 5d & 0c & 5b & 53 & 5b & d3 \\ d1 & 86 & db & 80 & 00 & 55 & 57 & d8 \\ 06 & 53 & 07 & 8c & 5a & 0b & 5b & da \\ 8f & 0c & 80 & 5a & 81 & 80 & 0f & d5 \\ 5d & dc & 5b & 80 & 01 & d5 & 5a & 89 \\ d6 & 84 & dd & 0c & 5b & 8a & d0 & 0e \\ 5d & dc & 5b & 80 & 01 & d5 & 5a & 89 \end{bmatrix};$$

$$A_1^{14}y_2 = \begin{bmatrix} 1d & \mathbf{00} & 1d & 4f & 6e & 77 & 6e & e8 \\ 7e & \mathbf{00} & 7e & ba & 99 & b6 & a6 & 37 \\ cc & \mathbf{00} & cc & f6 & 40 & 00 & 2b & af \\ 27 & \mathbf{00} & 27 & 8e & 59 & 34 & 16 & b6 \\ 19 & \mathbf{00} & 19 & c1 & 34 & 43 & 41 & 9e \\ 78 & \mathbf{00} & 78 & 37 & c0 & 82 & ea & b5 \\ c9 & \mathbf{00} & c9 & 7b & 18 & 37 & d5 & 60 \\ 78 & \mathbf{00} & 78 & 37 & c0 & 82 & ea & b5 \end{bmatrix};$$

$$A_1^{14}z_7 = \begin{bmatrix} b4 & 7e & ba & 99 & b6 & a6 & 37 & e6 \\ e3 & cc & f6 & 40 & 00 & 2b & af & 70 \\ 8d & 27 & 8e & 59 & 34 & 16 & b6 & 75 \\ df & 19 & c1 & 34 & 43 & 41 & 9e & 6b \\ 3a & 78 & 37 & c0 & 82 & ea & b5 & 52 \\ 6c & c9 & 7b & 18 & 37 & d5 & 60 & 1c \\ \mathbf{00} & \mathbf{00} & \mathbf{00} & \mathbf{00} & \mathbf{00} & \mathbf{00} & \mathbf{00} & \mathbf{00} \\ 6c & c9 & 7b & 18 & 37 & d5 & 60 & 1c \end{bmatrix};$$

In summation of the above description, the present invention herein complies with the constitutional, statutory, regulatory and treaty, patent application requirements and is herewith submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer-implemented cryptographic method, the method comprising:
   a memory including a plaintext M run by at least one variable module, and a computer-processor configured to perform the steps of:
   selecting dimension of M, wherein M forms . . . n-dimension binary matrix;
   selecting a diffusion-center P, wherein P expresses . . . n-dimension position;
   selecting a medium S, wherein S is . . . n-dimension position;
   selecting a function of point-diffusion . . . ; and
   setting a diffusion-cycle T, wherein . . .
   the method further comprising steps of:
   (a) encrypting M, wherein . . . ; and
   (b) decrypting C, wherein . . . ;
   wherein the said encrypting and decrypting steps are run by the said computer-processor.

2. The cryptographic method according to claim 1, wherein said function of point-diffusion comprises that:
   S overlaps A, $\dot{S}$ anchoring to P;
   $Ad_{ip}$, $1 \leq i \leq n$, expresses a series of n−1 dimensional binary matrixes $A_{d_i}$, $Ad_{ip} = [A_{d_i}(2), \ldots, A_{d_i}(p_i), A_{d_i}(0), A_{d_i}(p_i), \ldots, A_{d_i}(d_i-1)]$, on $d_i$ axis in order, wherein $A_{d_i}(p_i)$ represents the original matrix at $p_i$ position, and $A_{d_i}(0)$, expresses a zero matrix filling at $p_i$ position.

3. The cryptographic method according to claim 1, further including a password, wherein said password has at least one variable data, said data read by said module, each including: $(p_1, p_2, \ldots, p_n)$ and/or $d_1 \times d_2 \times \ldots \times d_n$ and/or $(\dot{s}_1, \dot{s}_2, \ldots \dot{s}_n)$ and/or $s_1 \times s_2 \times \ldots \times s_n$ and/or S and/or $T_E$ and/or $T_D$.

4. A computer-implemented cryptographic method, the method comprising:
   a memory including a plaintext M run by at least one variable module, and a computer-processor configured to perform the steps of:
   selecting dimension of M, wherein M forms . . . n-dimension binary matrix;
   selecting a diffusion-center P, wherein P expresses . . . n-dimension position;
   selecting a medium S, wherein S is . . . n-dimension position;
   selecting a block B, where . . . n-dimension position;
   selecting a function of block-diffusion . . . n-dimension position; and
   setting a diffusion-cycle T, wherein . . . the method further comprising steps of:
   (a) encrypting M, wherein . . . ; and
   (b) decrypting C, wherein . . . ;
   wherein the said encrypting and decrypting steps are run by the said computer-processor.

5. The cryptographic method according to claim 4, wherein said function of block-diffusion comprises that:
   S overlaps A based on $\dot{S}$ anchoring to P;
   $\hat{A}$ expresses A by B unit based on $\dot{B}$ anchoring to P, wherein $\hat{A}$ is $\hat{d}_1 \times \hat{d}_2 \times \ldots \times \hat{d}_n$ n-dimension binary matrix which has a block diffusion-center $\hat{P}$, wherein $\hat{P}$ expresses a $(\hat{p}_1, \hat{p}_2, \ldots \hat{p}_n)$ n-dimension position; lets $\hat{d}_i = \lfloor (p_i - \dot{b}_i)/b_i \rfloor + \lceil (d_i - p_i + \dot{b}_i)/b_i \rceil$, and $\hat{p}_i = |(p_i - \dot{b}_i)/b_i| + 1$, $1 \leq i \leq n$;
   $\hat{A}\hat{d}_{i\hat{p}}$, $1 \leq i \leq n$, expresses a series of n−1 dimensional binary matrixes $\hat{A}_{\hat{d}_i}$, $$\hat{A}\hat{d}_{i\hat{p}} = [\hat{A}_{\hat{d}_i}(2), \ldots, \hat{A}_{\hat{d}_i}(\hat{p}_i), \hat{A}_{\hat{d}_i}(0), \hat{A}_{\hat{d}_i}(\hat{p}_i), \ldots, \hat{A}_{\hat{d}_i}(\hat{d}_i-1)],$$

on $\hat{d}_i$ axis in order, wherein $$\hat{A}_{\hat{d}_i}(\hat{p}_i)$$

represents the original matrix at $\hat{p}_i$ position, and $$\hat{A}_{\hat{d}_i}(0)$$

expresses a zero matrix filling at $\hat{p}_i$ position.

6. The cryptographic method according to claim 4, further including a password, wherein said password has at least one variable data, said data read by said module, each including: $(p_1, p_2, \ldots, p_n)$ and/or $d_1 \times d_2 \times \ldots \times d_n$ and/or $(\dot{s}_1, \dot{s}_2, \ldots \dot{s}_n)$ and/or $s_1 \times s_2 \times \ldots \times s_n$ and/or S and/or $(\dot{b}_1, \dot{b}_2, \ldots, \dot{b}_n)$ and/or $b_1 \times b_2 \times \ldots \times b_n$ and/or $T_E$ and/or $T_D$.

7. A computer-implemented cryptographic method, the method comprising:
a memory including a plaintext M run by at least one variable module, and a computer-processor configured to perform the steps of:
selecting dimension of M, wherein M forms . . . n-dimension binary matrix;
selecting a diffusion-center P, wherein P expresses . . . n-dimension position;
selecting a medium S, wherein S is . . . n-dimension position;
selecting a block B, where . . . n-dimension position;
selecting a switch Y, wherein Y represents . . . a function of block-diffusion;
selecting said function of point-diffusion . . . ;
setting a diffusion-cycle T1, wherein . . . ;
setting a diffusion-cycle T2, wherein . . . ; and the method further comprising steps of:
(a) encrypting M, wherein . . . ; and
(b) decrypting C, wherein . . . ;
wherein the said encrypting and decrypting steps are run by the said computer-processor.

8. The cryptographic method according to claim 7, wherein said function of point-diffusion comprises that:
S overlaps A, $\dot{S}$ anchoring to P;
$Ad_{ip}$, $1 \leq i \leq n$, expresses a series of n−1 dimensional binary matrixes $A_{d_i}$, $Ad_{ip} = [A_{d_i}(2), \ldots, A_{d_i}(p_i), A_{d_i}(0), A_{d_i}(p_i), \ldots, A_{d_i}(d_i-1)]$, on $d_i$ axis in order, wherein $A_{d_i}(p_i)$ represents the original matrix at $p_i$ position, and $A_{d_i}(0)$ expresses a zero matrix filling at $p_i$ position.

9. The cryptographic method according to claim 7, wherein said function of block-diffusion comprises that:

S overlaps A based on $\dot{S}$ anchoring to P;
$\hat{A}$ expresses A by B unit based on $\hat{B}$ anchoring to P, wherein $\hat{A}$ is $\hat{d}_1 \times \hat{d}_2 \times \ldots \times \hat{d}_n$ n-dimension binary matrix which has a block diffusion-center $\hat{P}$, wherein $\hat{P}$ expresses a $(\hat{p}_1, \hat{p}_2, \ldots, \hat{p}_n)$ n-dimension position; lets $\hat{d}_i = \lceil(p_i-b_i)/b_i\rceil + \lceil(d_i-p_i+b_i)/b_i\rceil$, and $\hat{p}_i = \lceil(p_i-b_i)/b_i\rceil + 1$, $1 \leq i \leq n$;
$\hat{A}\hat{d}_{i\hat{p}}$, $1 \leq i \leq n$, expresses a series of n−1 dimensional binary matrixes $\hat{A}_{\hat{d}_i}$, $$\hat{A}_{\hat{d}_i}, \hat{A}\hat{d}_{i\hat{p}} = [\hat{A}_{\hat{d}_i}(2), \ldots, \hat{A}_{\hat{d}_i}(\hat{p}_i), \hat{A}_{\hat{d}_i}(0), \hat{A}_{\hat{d}_i}(\hat{p}_i), \ldots, \hat{A}_{\hat{d}_i}(\hat{d}_i-1)],$$

on $\hat{d}_i$ axis in order, wherein $$\hat{A}_{\hat{d}_i}(\hat{p}_i)$$

represents the original matrix at $\hat{p}_i$ position, and $$\hat{A}_{\hat{d}_i}(0)$$

expresses a zero matrix filling at $\hat{p}_i$ position.

10. The cryptographic method according to claim 7, further including a password, wherein said password has at least one variable data, said data read by said module, each including: $(p_1, p_2, \ldots p_n)$ and/or $d_1 \times d_2 \times \ldots \times d_n$ and/or $(\dot{s}_1, \dot{s}_2, \ldots \dot{s}_n)$ and/or $s_1 \times s_2 \times \ldots \times s_n$ and/or S and/or $(b_1, b_2, \ldots, b_n)$ and/or $b_1 \times b_2 \times \ldots \times b_n$ and/or Y and/or $T_{E1}$ and/or $T_{D1}$ and/or $T_{E2}$ and/or $T_{D2}$.

* * * * *